US007145433B2

(12) United States Patent
Gerstenkorn

(10) Patent No.: US 7,145,433 B2
(45) Date of Patent: Dec. 5, 2006

(54) SYSTEM FOR TRANSPORTATION OR ACCESS CONTROL OF PERSONS OR GOODS, AND METHOD, DEVICE AND COMPUTER PROGRAM FOR MAINTENANCE OF THE SYSTEM, AND METHOD FOR RETROFITTING A BUILDING WITH THE SYSTEM

(75) Inventor: Bernhard Gerstenkorn, Lucerne (CH)

(73) Assignee: Inventio AG, Hergiswil (CH)

( * ) Notice: Subject to any disclaimer, the term of this patent is extended or adjusted under 35 U.S.C. 154(b) by 196 days.

(21) Appl. No.: 10/283,956

(22) Filed: Oct. 30, 2002

(65) Prior Publication Data

US 2003/0080851 A1 May 1, 2003

(30) Foreign Application Priority Data

Nov. 1, 2001 (EP) ................................ 01811062

(51) Int. Cl.

| | |
|---|---|
| ***G05B 19/00*** | (2006.01) |
| ***G05B 23/00*** | (2006.01) |
| ***G06F 7/00*** | (2006.01) |
| ***G08B 29/00*** | (2006.01) |
| ***H04B 1/00*** | (2006.01) |

(52) U.S. Cl. ...................... 340/5.22; 340/5.8; 340/5.7; 187/384

(58) Field of Classification Search ............... 340/5.22, 340/5.8, 5.23, 5.24, 5.25, 5.7, 5.71, 5.73; 187/384, 392–394, 121, 126, 351; 455/420
See application file for complete search history.

(56) References Cited

U.S. PATENT DOCUMENTS

| | | | | |
|---|---|---|---|---|
| 5,410,717 | A * | 4/1995 | Floro | 710/104 |
| 5,554,832 | A * | 9/1996 | Lumme et al. | 187/380 |
| 5,689,094 | A | 11/1997 | Friedli et al. | |
| 5,749,443 | A * | 5/1998 | Romao | 187/384 |
| 5,815,557 | A | 9/1998 | Larson | |
| 5,952,626 | A * | 9/1999 | Zaharia | 187/381 |
| 5,969,305 | A * | 10/1999 | Gielis et al. | 187/391 |
| 6,382,363 | B1 * | 5/2002 | Friedli | 187/384 |

FOREIGN PATENT DOCUMENTS

| | | | |
|---|---|---|---|
| DE | 199 37 039 | A | 2/2001 |
| EP | 0540 984 | A2 | 5/1993 |
| GB | 2 069 582 | A | 8/1981 |
| WO | WO 01/40605 | A1 | 5/2001 |

* cited by examiner

*Primary Examiner*—Brian Zimmerman
*Assistant Examiner*—Nam Nguyen
(74) *Attorney, Agent, or Firm*—Schweitzer Cornman Gross & Bondell LLP

(57) ABSTRACT

A system for transportation or access control of persons and/or goods in a building comprises at least one story terminal for recognition of at least one identification code of a person or an item, at least one data memory for storing at least one user profile with details with respect to a predefined destination story of the person or item or with details with respect to the access authorization of the person or item to a zone of the building, and at least one processor for associating a recognized identification code with a user profile. The processor and the data memory are arranged in at least one bus module. The bus module communicates, through a signal bus, details with respect to the predefined destination story of the person or item or details with respect to the access authorization of the person or item to the zone. A methodology for maintaining the system can be implemented through a computer program. The system can also be retrofitted into existing installations.

22 Claims, 4 Drawing Sheets

SYSTEM FOR TRANSPORTATION OR ACCESS CONTROL OF PERSONS OR GOODS, AND METHOD, DEVICE AND COMPUTER PROGRAM FOR MAINTENANCE OF THE SYSTEM, AND METHOD FOR RETROFITTING A BUILDING WITH THE SYSTEM

The present invention relates to a system for transportation or access control of persons and/or goods as well as a method, device and computer program for maintenance of the system and a method for retrofitting a building with the system.

BACKGROUND OF THE INVENTION

Systems for the transportation of persons and/or goods are known as public or individual transport means such as railways, automobiles, aircraft, lift installations, cable ways, escalators, etc. In the following, a transport means in the preferred form of a lift installation is discussed. The persons and/or goods to be conveyed are termed "user".

Systems for access control of persons and/or goods are equally known. For example, the access of persons to a location may be controlled by mechanical keys, which fit in a corresponding mechanical lock, or by identification codes which are recognised and checked by a recognition device, etc. In such an example, access means such as doors are actuated.

EP 0 699 617 is considered the closest state of the art with regard to the present invention. This document discloses a contactless drive control of a lift installation utilizing identification codes. An identification transmitter transmits by radio an identification code to a recognition device. The recognition device arranged at a story terminal recognizes the identification code and passes on details with regard to the recognised identification code as an identification signal to a processing unit. It is also possible to input an identification code by way of a manual input means of the story terminal. Details with respect to the recognized identification code are similarly passed on as an identification signal to the processing unit. The processing unit is a separate computer unit with a special housing for processor and data memory, as well as manual input means and visual output means. The processor of the processing unit associates with the identification signal a predefined destination story, which is stored in the data memory of the user. The processing unit transmits details with respect to the destination story to a lift control, which evaluates details with respect to the boarding story and destination story and transmits appropriate control signals to a drive of a lift cage in order to transport the user automatically from the boarding story to the destination story.

Such a lift installation, controlled by identification codes, with a story terminal and processing unit, is primarily suitable for large buildings with a large number of users to be transported and with several lifts arranged in parallel beside one another. In accordance with the evaluation performed by the processing unit, the lift most favourable for transporting is displayed to the user by way of a display.

This system allows simple, practical, economic and reliable access control relative to the building. For example, an identification transmitter which has become lost can be reconfigured or a further identification code can be assigned to a user without—as usual in traditional systems for access control—mechanical keys/locks having to be changed.

It has now proved disadvantageous that such a lift installation with story terminals and a processing unit is relatively costly to acquire.

In addition, maintenance of this system has proved relatively expensive. By the term "maintenance" there is subsumed, in particular, a change in the destination story, which is stored in the processing unit, and the configuration of the identification transmitter. These actions are undertaken at the processing unit. For this purpose, an operator has to go to the processing unit and start and operate a special computer program by way of the manual input means and the visual output means. It is disadvantageous that the operation of the computer program by way of the manual input means and the visual output means has to be learned and accepted by the operator.

An object of the present invention is the provision of a system for transporting or controlling the access of persons or goods with a lift installation which is economical to acquire and simple and uncomplicated to maintain. Further objects of the invention are to provide a method, device and computer program product for maintenance of this system. This system, method, device and computer program is to be compatible with proven standards of machine construction and communications technology. In addition, the system is to be capable of simple and economic retrofitting in existing buildings.

BRIEF DESCRIPTIONS OF THE INVENTION

The invention is based on a first surprising observation that a lift installation, which is controlled by means of an identification code and which has at least one processing unit for association of a predefined destination story with an identification code, can also be operated without such processing unit. The omission of the processing unit, which consists of a separate computing unit with a special housing for the processor and data memory, as well as a manual input means and a visual output means, make the acquisition of the lift installation economic and the maintenance of the lift installation simple and uncomplicated. The system is realised with at least one transport means in at least one building. In particular, this system is suitable for small buildings with few users to be transported.

In order to be able to operate the lift installation without a processing unit, the tasks undertaken by it must be solved in another way.

It has been found that the processing unit can be replaced by at least one bus module. A bus module is an electronic card with at least one data memory and at least one processor, which electronic card communicates by way of a signal bus. The bus module communicates by way of the signal bus with at least one story terminal. Advantageously, the signal bus is an LON bus, where processors communicate with one another in a direct manner and are programmable.

In one advantageous form of embodiment a first bus module is a data bank with at least one user profile and a second bus module is a job manager with at least one requests table. A story terminal passes to the data bank, by way of the signal bus, details with respect to a recognised identification code of a user as at least one identification signal. The data bank reads in the identification signal and associates with the identification signal a destination story predefined in the user profile. The data bank transmits the details with respect to the destination story by way of the signal bus to the story terminal. The story terminal reads in the details and transmits details with respect to boarding story and destination story of the identified user by way of the signal bus to the job manager. The job manager reads in the details and enters them in the requests table. The request table is worked through. In accordance with the requests table the job manager controls, by way of an input/output bus, at least one lift control which controls a drive of a lift cage. The user is transported from the boarding story to the destination story.

The invention is also based on a second surprising observation that in the user profile—apart from details with respect to a predefined destination story—can also document further details concerning rights and preferences of the user, such as the access authorisation thereof in terms of time and space to at least one zone of the building. Thus, the invention concerns not only the transport means as such, i.e. the transportation of persons/goods by a lift installation, but also an access control of persons/goods by way of at least one access means to a zone of the building.

In an advantageous form of embodiment a first bus module is a data bank with at least one user profile and a second bus module is a job manager with at least one check routine. A story terminal passes to the data bank, by way of the signal bus, details with respect to a recognized identification code of a user as at least one identification signal. The data bank reads in the identification signal and associates with the identification signal an access authorization to zones of the building, which is stored in the user profile of the user. The data bank thereupon transmits details with respect to the access authorisation of the identified user by way of the signal bus to the story terminal. A story terminal reads in these details and examines the access authorization of the identified user relative to the destination story. In the case of a positive result the story terminal now transmits to the job manager, through a signal bus, details with respect to the boarding story, destination story and access authorization of the identified user. The job manager reads in these details and executes a check routine. The check routine ensures, for example, that users with mutually exclusive access authorizations cannot enter the lift cage. In the case of a positive result, these details are recorded in the requests table. The requests table is worked through. In accordance with the requests table, the job manager controls the lift control by way of the input/output bus, which lift control controls a drive of a lift cage. The user is transported from the boarding story to the destination story to give the user access to the destination story. Alternatively, the story terminal activates an access means in accordance with the positive result of the check routine.

The invention is further based on a third surprising observation that the maintenance of the system, i.e. a change in the user profiles stored in the data memory as well as configuration of an identification transmitter, can be undertaken by way of a device familiar to the operator and simple to use. A change in a user profile may incorporate a laying down, a partial laying down and/or an erasure of a user profile. Advantageously, the device is a story terminal or an everyday device, i.e. a device of everyday use such as a cordless telephone or a fixed system telephone. Advantageously, the everyday device communicates by way of at least one bus modem with the signal bus. A change in the user profile or a configuration of the identification transmitter may be undertaken by way of a Manual input means or by way of a microphone.

The change in the user profile or configuration of the identification transmitter is executed by way of at least one computer program. The operator operates the computer program by way of the device. The device communicates with the data store in which the user profile is stored and changes the user profile. The device also communicates with a recognition device and thus configures the identification transmitter. The computer program examines a master identification code and identifies the operator as authorised to undertake the maintenance. The computer program recognizes the input of at least one function code, recognises the input of at least one functional data and executes a function, which is associated with the functional code, with the functional information.

By virtue of the modular mode of construction the components of the system, existing lift installations can be retrofitted with a system in a simple and uncomplicated manner. Preferably, the bus module is conceived as a plug-in module which can be plugged into a story terminal or into a lift control. The bus module, which carries the processor and the data memory, is installed in the signal bus for communication with the story terminal and the lift control. Components of the computer program are installed in the bus module or in the device.

BRIEF DESCRIPTION OF THE DRAWINGS

The invention is explained in more detail in the following description of illustrative embodiments, in connection with the annexed drawings, in which.

DETAILED DESCRIPTION OF THE INVENTION

Figure 1:
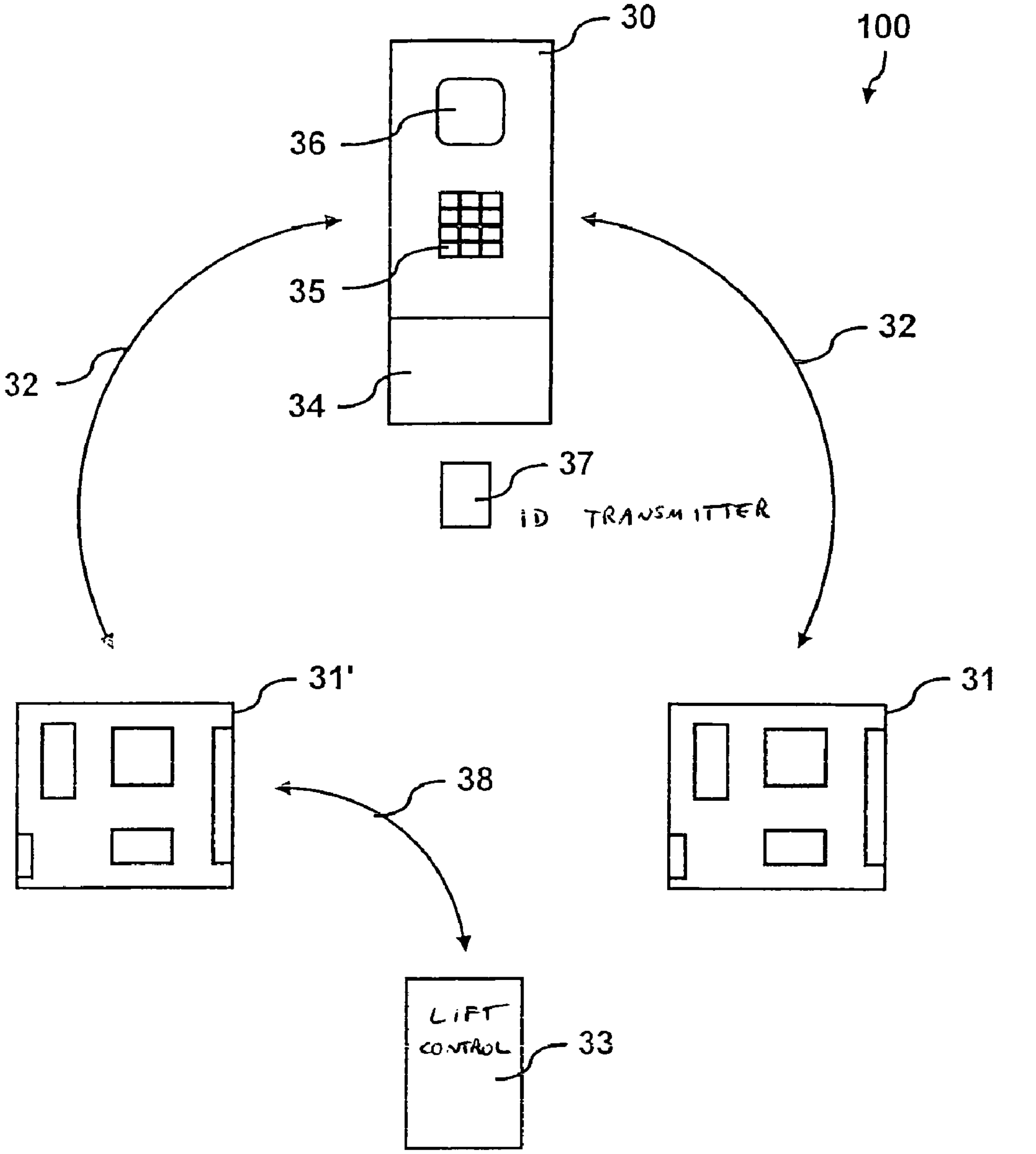
FIG. 1 is a diagrammatic illustration of a first embodiment, of a system for transportation or access control of persons or goods in accordance with the invention.
Figure 3:
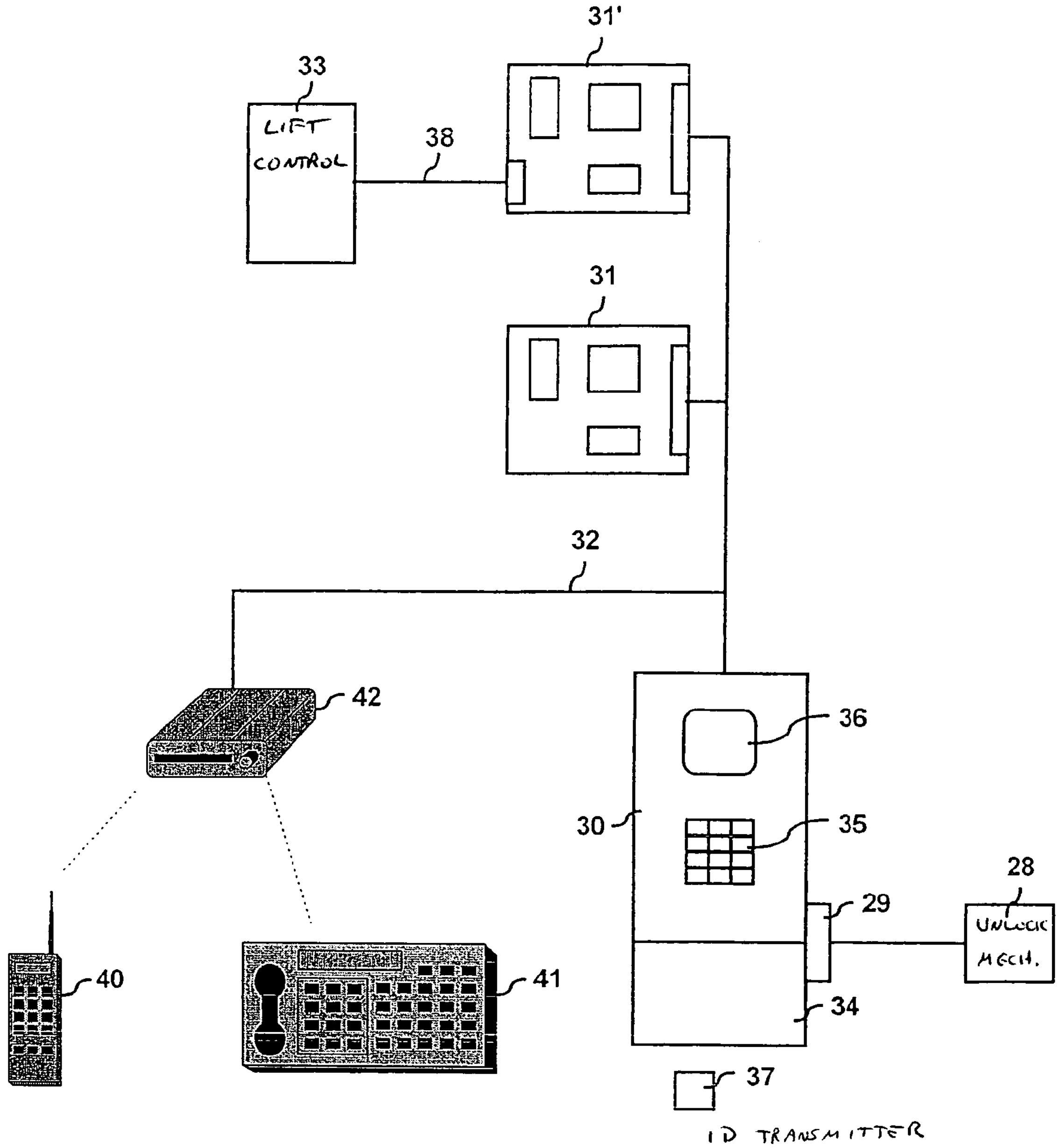
FIG. 3 is a diagrammatic illustration of a device for maintenance of the system for transportation or access control of persons or goods.

The system 100 for transportation or access control of persons or goods according to FIGS. 1 and 3 comprises at least one story terminal 30, at least one bus module 31, 31', at least one signal bus 32 and at least one lift control 33 or at least one access means. For example, the lift control 33 may control a drive of a lift cage, wherein the drive, for example, moves the lift cage by way of a conveying cable. The access means is, for example, a door to the building or within the building. The lift installation is installed in at least one building or building complex and transports users from one story to another story. Advantageously, a story terminal 30 is mounted in each story near a story door for the lift installation. Alternatively, it is obviously possible to mount only a single story terminal, for example at the entrance to the ground floor of the building.

The story terminal 30 according to FIGS. 1 and 3 comprises at least one recognition device 34 for recognition of at least one identification code or at least one manual input means 35 for input of an identification code, as well as at least one visual output means 36. Moreover, the story terminal 30 or one of its components comprises at least one processor for communication by way of a signal bus 32. Preferably, the identification code of at least one identification transmitter 37 is transmitted to the recognition device 34. The recognition of such an identification code is known from EP 0 699 617. The identification transmitter 37 and the recognition device 34 preferably communicate in a contactless manner.

The identification transmitter is, for example, a transponder with a transponder antenna and transmitter electronic system. The transmitter electronic system of the identification transmitter 37 comprises, for example, a transmitter and receiver unit and a data memory with at least one identification code, according to which the bearer of the identification transmitter 37 is uniquely identifiable. For example, 6 bytes of data, such as the type designation of the identification transmitter and/or a serial code and/or an identification code of 5 to 9 characters length, etc., are stored per identification transmitter. The identification transmitter 37 is supplied with an operating voltage, for example, by induction by way of an electromagnet field. Preferably, the recognition device 34 radiates such an electromagnetic field. As soon as the identification transmitter 37 is disposed in the vicinity of the recognition device 34 it is supplied with energy and transmits the identification code to the recognition device 34. The identification transmitter 37 for this purpose is, for example, held at a spacing of a few centimetres in front of the recognition device 34. The recognition device 34 receives the identification code by way of a correspondingly constructed transmitter and receiver antenna. The recognition device 34 can preferably read and write the data memory of the identification transmitter 37 by an electronic reading and writing unit. There obviously also exist identification transmitters which can communicate with a recognition device from several metres away.

With knowledge of the present invention one skilled in the art can realize any variations of this form of embodiment of an identification transmitter or a recognition device provided for that purpose. Thus, other identification transmitters, for example those communicating with a recognition device in contactless manner on the basis of light, are equally usable. In addition, identification transmitters in the form of magnet cards, electronic chips, etc., which communicate with a recognition device by way of at least one intermediary contact, are usable. Alternatively, it is possible to input an identification code acoustically, for example by way of a microphone, at the story terminal. The microphone, for example, receives at least one frequency and recognizes this frequency, or a user speaks into the microphone, which speech input is recognised by a recognition device. Finally, it is possible to recognise an individual identification code of a user, such as fingerprint, an iris, a facial profile, a magnetic field, etc., by a recognition device.

The story terminal 30 and the bus module 31, 31' communicate by way of the signal bus 32. The signal bus 32 can be any modern standard bus. Such a signal bus is known to those skilled in the art. It can be a signal bus operating on the basis of electrical or optical signal transmission, such as an ethernet network, a token ring network, etc. In addition, it can be a radio network, an infrared network, a radar network, a directional beam network, etc. With knowledge of the present invention numerous possibilities of realization with respect thereto are open those skilled in the art. Advantageously, the signal bus 32 is a LON bus. The LON bus is a technology which enables construction of decentrally controlled networks with use of many simple nodal points. Individual processors can communicate on the LON bus like personal computers in a network. In particular, direct communication between the individual processors is possible. A never-yet achieved price/performance ratio is then attained. The LON bus protocol is the carrier of the control information and the individual processors can be controlled directly by way of the LON bus. The nodal points can be programmed by logical links. The LON bus has available a free topology and can be structured in lines, circles, trees, etc. The signal bus 32 according to FIGS. 1 and 3 is, for example, an LON bus with branched topology. The transmission and data security is high. The transmission media, such as twin-wire, 230/400 VAC mains, radio, infrared, microwaves, fibre-optics, Internet, etc., can be freely selected.

The bus module 31, 31' and the lift control 33 communicate, for example, by way of at least one input/output bus 38. The input/output bus 38 can be any parallel logic bus, for example a 24 V logic bus. Such an input/output bus is known to one skilled in the art. For example, such a parallel 24 V logic bus is encountered in many older lift installations. Such older lift installations are modernised, i.e. at least one component of the lift installation is replaced. Such older lift installations, in particular, mostly do not have an LON bus, so that communication is to be undertaken by way of an input/output bus.

In addition, it is possible—as illustrated in the form of embodiment according to FIG. 3—that the story terminal 30 activates at least one access means. Advantageously, the story terminal 30 communicates by way of at least one power driver 29 with at least one door lock unlocking mechanism 28 for actuation of the access means in the form of a door. Such an access means with a door lock locking mechanism and power driver are known to those skilled in the art. The access means is, for example, the story door of a lift installation.

Figure 2:
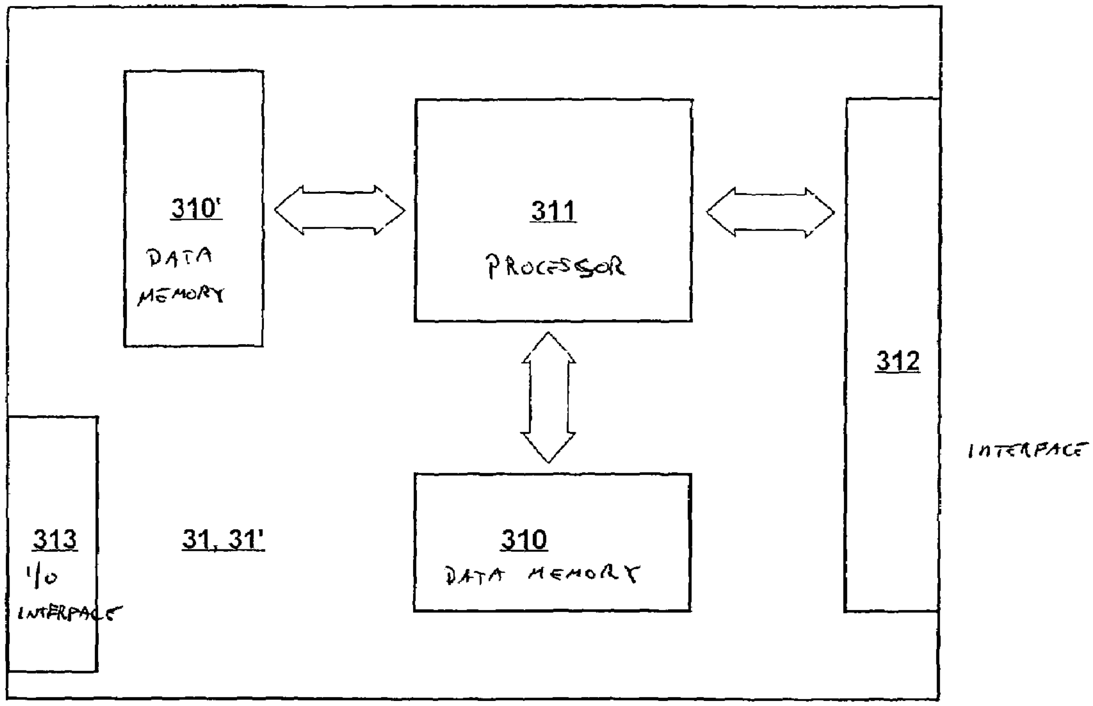
FIG. 2 is a schematic illustration of a bus module of the invention.

The bus module 31, 31' according to FIG. 2 comprises at least one data memory 310, 310', at least one processor 311, at least one interface 312 and at least one input/output interface 313. The bus module 31 is an electronic card, which communicates by way of the signal bus 32. The bus module 31, 31' is connected with the signal bus 32 by way of the interface 312. The interface 312 mediates in terms of hardware and in terms of software between the processor 311 and the transmission medium of the signal bus 32. The input/output interface 313 mediates between the bus module 31, 31' and the lift control 33. The bus module 31, 31' comprises, for example, a non-volatile data memory 310 and a volatile data memory 310' or working memory. For example, at least one computer program or at least one user profile is stored in the non-volatile data memory 310. The bus module 31, 31' can be constructed as a circuitboard or as a component of a circuitboard (see FIG. 2). The bus module 31, 31' is, for example, a plug-in module in the housing of a story terminal 30 or a lift control 33. The bus module 31, 31' can, however, also be arranged as a set-top box in an appropriate housing.

In the advantageous form of embodiment of a system 100 according to FIGS. 1 and 3 at least one processor of the story terminal 30 and a processor of the bus module 31, 31' communicate by way of an LON bus as the signal bus 32. Advantageously, two bus modules 31, 31' are used. A first bus module 31 has at least one data bank with at least one user profile. A second bus module 31' is at least one job manager with at least one requests table. These units thus exchange data in accordance with the LON bus protocol. For example, the story terminal 30 transmits to the first bus module 31 as an identification signal an identification code recognized in a story or in a zone. The first bus module 31, for example, reads in the identification signal and transmits details with respect to the predefined destination story and the access authorization of the identified user to the story terminal 30. The story terminal 30, for example, reads in these details and then transmits to the second bus module 31' details with respect to the boarding story, destination story or access authorization of the identified user. The second bus module 31', for example, reads in these details and controls the lift control 33 by these details in accordance with a requests table or the result of a check routine carried out by the second bus module 31'.

Obviously, it is possible to provide two or more bus modules 31, which serve as data banks, in the signal bus 32. For example, two data banks are present in the signal bus 32, wherein a second data bank is a back-up or a safety copy of the first bus module 31. A filled data memory of a first bus module 31 can thus, for example, be copied over to an empty data memory of a second bus module. In addition, in this manner on-line replications of user profiles can be produced in the signal bus. Finally, it is possible in the case of failure of a first data memory, to automatically switch over to a safety copy of the first data memory without the operation of the system having to be interrupted or disturbed.

It is equally well possible to provide two or more bus modules 31', which serve as job managers, in the signal bus 32. For example, two job managers for two lift installations are present in the signal bus 32. One skilled in the art has numerous possibilities of variation with respect thereto. For example, the story terminal 30 can transmit, to two such job managers, enquiries with respect to the boarding story and the destination story of an identified user and obtain two transport offers from the job managers, compare these transport offers with one another, and then implement the transport offer with quicker transport or more comfortable transport for the user.

Finally, it is possible for the user to realise the data bank and the job manager in a single bus module.

The bus module 31, 31' is advantageously implemented at a node point of an LON bus. In the data store 310 there can be stored, for example, 150 or 300 user profiles, and 500 or 1000 identification codes can be managed. An access to a user profile lasts for, for example, 100 to 200 msec. A change, cancellation or storage of a user profile lasts, for example, for 200 msec.

User-specific data are stored in the user profile. This contain data about a predefined destination story of the user as well as data about the at least one identification code of the user in order to be able to undertake a unique association of user profile and identification code. Moreover, additional user-specific data are documented in the user profile. Thus, further details about rights and preferences of the user, such as the access authorization thereof in terms of time and/or space to zones of the building, are documented. The user profile comprises, for example, a list with at least one identification code as well as a list with at least one zone authorized for access.

The access authorisation in terms of time and/or space to zones according to a user profile is illustrated in the following example:

Each story of the building forms its own zone. The building is, for example, a multiple dwelling with two parties. A first party (first user) lives in the first story and a second party (second user) lives in the second story. In addition, the landlord is a third user and the postman a fourth user.

All four users have access to the first zone, i.e. the lowermost story of the building. In particular, the first party and the second party as well as the landlord have unrestricted access (24 hours a day and 365 days a year), whilst the fourth user has access only on post delivery days (Monday to Saturday) and only at post delivery times (8 o'clock in the morning to 12 o'clock midday).

Only the first party has unrestricted access to the second zone, i.e. the first story of the building, and only the second party has unrestricted access to the third zone, i.e. the second story of the building.

With knowledge of the present invention one skilled in the art can realize numerous variations of this access authorisation. Thus further users can be laid down, for example visitors, a cleaner, etc. In addition, the zones can be further divided, for example into story regions, building wings, etc.

The bus module 31, 31' comprises at least one computer program for association of an identification signal with a user profile (undertaken by the data bank) or for filling out and working through a requests table (undertaken by the job manager) or for performing a check routine (undertaken by the job manager), etc. The computer program is, for example, loaded from the non-volatile store 310 and executed by the processor 311.

With respect to the association of an identification signal with a user profile, details with regard to a recognized identification code are loaded as an identification signal into the volatile data store 310' of the data bank. The computer program compares the identification signal with the identification addresses of stored user profiles. The user profile is uniquely identifiable by way of an identification address. An identification code exists for each identification address. For example, an identification address can be associated precisely with a recognized identification code when the identification address and identification code are identical. The computer program then delivers a positive association result when one of the stored identification addresses is identical with the identification signal, but otherwise the computer program delivers a negative association result. Details from the user profile are transmitted from the data bank by way of the signal bus 32 to the story terminal 30.

With regard to the filling up and working down of a requests table, details with respect to a boarding story and destination story of a user are loaded into the volatile data store 310' of the job manager. The computer program fills these details into a requests table. Optionally, further details, such as a delay time in the execution of the request, are taken into consideration. The computer program works through the requests table and the job manager for that purpose transmits at least one request signal to the lift control 33 by way of the input/output bus 38.

With regard to the performance of a check routine, details with respect to a boarding story, a destination story and the access authorization of a user are loaded into the volatile data store 310' of the job manager. The computer program undertakes a check routine with these details. For example, each story forms a zone. The access authorization consists, for example, of a list with at least one story authorized for access. The check routine then compares whether the destination storey is contained in the list with the at least one access-authorized zone. In the case of a positive result, the job manager transmits at least one request signal to the lift control 33 by way of the signal bus 32.

The lift control 33 reads in the request signal of the job manager and thus controls the drive of the lift cage. The lift control 33 and drive are, for example, connected together by way of at least one electrical signal line. The lift control **33*a* in known manner generates at least one target value, for example at least one control or regulating function is present and at least one start or at least one stop is realised. Advantageously, the system 100 is installed in small buildings with less users to be transported or an existing lift installation is equipped with the system 100. The lift control 33** is then also in the position of acknowledging at least one cage call, opening and closing cage doors at one side or both sides, processing data concerning cage door status (open, closed), etc.

With knowledge of the present invention one skilled in the art can realize numerous variations of a lift control. Thus, in principle all known controls of transport means can be used. For example, instead of a lift control or in addition to a lift control also a control for a transport means, such as a cable way, an escalator, etc., can be used. In particular, on the basis of the invention several such controls of transport means can be used in combination. The system in a building or a building complex is, for example, realized for at least one lift installation or at least one escalator. Finally, the access authorization can also extend to an access means such as a door to the building or a door within the building. In the form of embodiment—by way of example—according to FIG. 3, the story terminal 30 activates an access means by way of a power driver 29 and a door lock unlocking magnet 28. Advantageously, this activation takes place only when the check routine has compared whether the user is authorized to have access to a zone which is directly accessible by the access means. The check routine thus compares whether this zone directly accessible by the access means is contained in the list with the at least one access-authorized zone of the user. In the case of a positive result, the job manager transmits at least one request signal to the power driver 29 and the door lock unlocking magnets 28 by way of the signal bus 32. Maintenance of the system 100 includes, for example, a change in the user profile stored in the data memory 310 as well as a configuration of an identification transmitter 37 by way of a device which is familiar to the operator and simple to operate. In the embodiment according to FIG. 3, the device is advantageously a story terminal 30 or an everyday device such as a cordless telephone 40 or a fixed system telephone 41. The operator uses, for example, the manual input means 35 of the story terminal 30 or a manual input means of the cordless telephone 40 or of the fixed system telephone 41 for the input of the change in the user profile or for the configuration of the identification transmitter 37. Advantageously, the everyday device communicates with the signal bus 32 by way of at least one bus modem 42. For example, the cordless telephone 40 or the fixed system telephone 41 selects a telephone number of the bus modem 42. Advantageously, the bus modem 42 is a modem which supports the LON bus as the signal bus 32 and communicates by way of an LON bus with the story terminal 30 or the bus module 31, 31' or the lift control 33. With knowledge of the present invention one skilled in the art can realize numerous variations of everyday devices. Thus, the everyday device can also be a laptop, a handheld computer, a sub-notebook, etc. In addition, the operator can undertake the input of the change in the user profile or the configuration of the identification transmitter 37 by way of a microphone of the cordless telephone 40 or the fixed system telephone 41, wherein speech input is recognized by a recognition device.

At least one computer program for changing a user profile or for configuration of the identification transmitter is executed by the device. The operator controls the computer program by way of the device. The device communicates with the data memory 310 of the first bus module 31, in which the user profile is stored, and adds a user profile, changes the user profile, or erases a user profile, or the device communicates with a recognition device 34 of the story terminal 30 and thus configures the identification transmitter 37.

Figure 4:
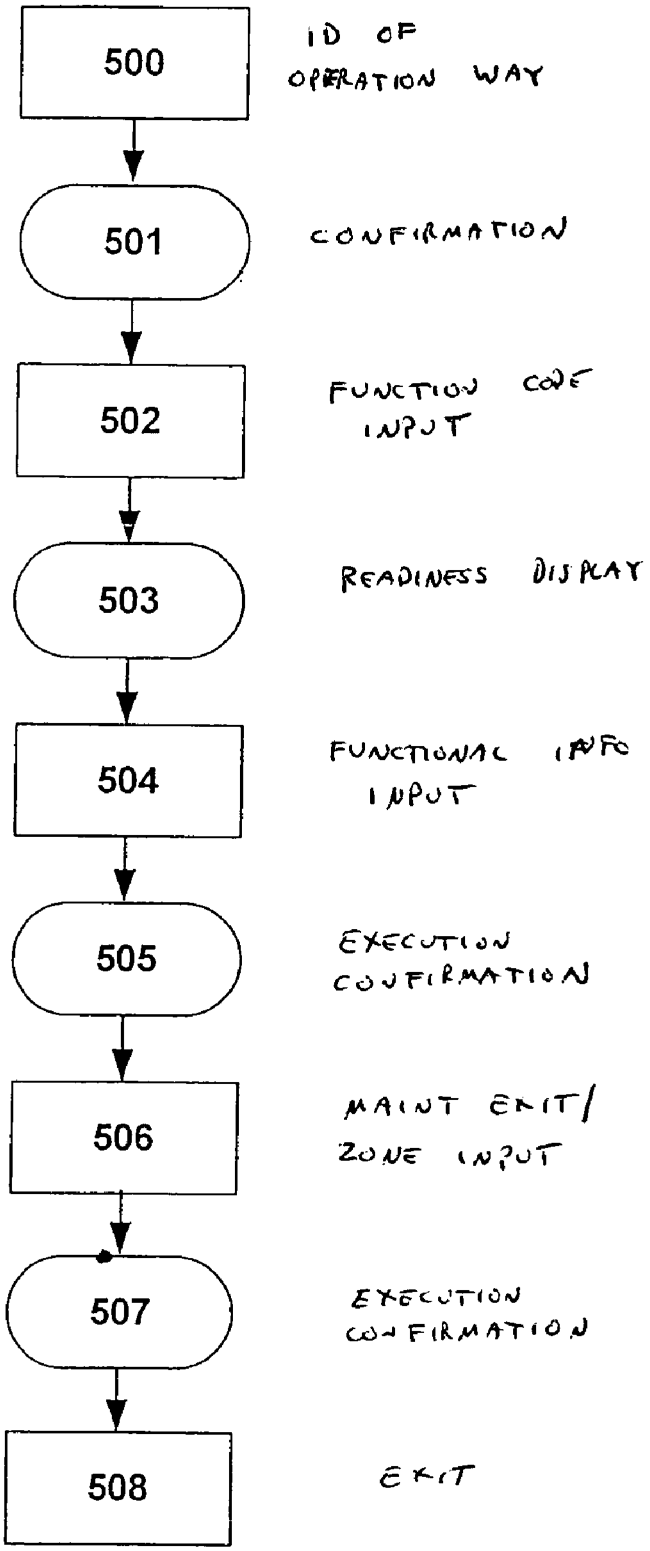
FIG. 4 is a block diagram of a computer program for maintenance of the system for transportation or access control of persons or goods.

A block diagram of the computer program is illustrated in FIG. 4. In that case, actions 500, 502, 504, 506, 508 and results 501, 503, 505, 507 alternate. These actions and results are discussed in detail as follows:

A first action 500 is the identification of the operatory way of the input of at least one master identification code. Mintenance is started by this secret master identification code, i.e. the operator obtains, as master, access to the change functions or configuration functions of the computer program. For example, the master identification code is stored on an identification transmitter 37 and is recognized by a recognition device 34 of the story terminal 30, and/or the master identification code is input by way of a manual input means 35 of the story terminal 30 or by way of a manual input means of an everyday device. Finally, it is possible to recognize an individual master identification code such as a fingerprint, an iris, a facial profile, a magnetic field, etc., by a recognition device.

The computer program product examines the validity of the master identification code. Advantageously, at least one master user profile is stored in a data memory. The master user profile is uniquely identifiable by way of a master identification address. A master identification code exists for the master identification address. For example, a master identification address can be associated precisely with a recognized master identification code when the master identification address and master identification code are identical. The computer program product compares the master identification code with the stored master user profile. A first result 501 of the identification code is confirmation. This confirmation takes place, for example, by way of visual output means 36 of the story terminal 30 or by way of a visual output means of an everyday device. Finally, it is also possible to undertake confirmations acoustically by way of a loudspeaker or as vibrations by way of a vibrator, etc. In the case of first use of the system 100 it is possible to preset a known master identification code, for example a master identification code "80000" is preset in the factory. Through input of the numerical sequence "80000", a master identification code can then be generated. For details with respect thereto, see under the function "add user". Advantageously, this known master identification code is blocked after successful establishing a secret master identification code.

A second action 502 of the operator is the input of at least one function code. Input of the number "1" may code the function "add user"; input of the number "2" may code the function "remove user"; Input of the number "3" may code the function "allocate new identification transmitter"; input of the number "4" may code the function "display user profile"; input of the number "5" may code the function "free or erase zones"; input of the number "6" may code the function "display data memory size"; and input of the number "7" may code the function "display already assigned passwords".

The computer program product recognizes the function code. A second result 503 of the computer program product is a readiness display.

A third action 504 of the operator is the input of at least one piece of functional information, such as the input of an identification code or the undertaking of at least one functional processing, such as the reading/writing of an identification transmitter 37.

The operator may: input the identification code of a new user (Function 1). This can also be a new secret master identification code; input the identification code of a user to be removed or brings the identification transmitter 37 of a user to be removed into the vicinity of a recognition device

34 reading this identification transmitter 37 (Function 2); input the identification code of a new identification transmitter 37 to be allocated and brings an identification transmitter 37, which is to be written with this identification code, into the vicinity of a recognition device 34 writing this identification transmitter 37 with the identification code (Function 3); input the identification code of a user profile, which is to be displayed, or brings the identification transmitter 37 of the user of this user profile to be displayed into the vicinity of a recognition device 34 reading this identification transmitter 37 (Function 4); input the identification code of a user for which zones are to be released or cancelled or brings the identification transmitter 37 of the user for the zones, which are to be released or cancelled, into the vicinity of a recognition device 34 reading this identification transmitter 37 (Function 5); or input the master indication code or brings the master identification transmitter into the vicinity of a recognition device 34 reading this master identification transmitter (Functions 6 and 7).

The computer program product recognises the functional information and executes the function which is associated with the function code, with the input functional information. A third result 505 of the computer program product is a confirmation of the execution of the function. The identification code of a new user is stored in the data memory 310 of the bus module 31 as a user profile (Function 1); the user profile of a user to be removed is erased in the data memory 310 of the bus module 31 (Function 2); the identification transmitter 37 is written by the recognition device 34 with an identification code (Function 3); details with respect to the user profile are read out of the data memory 310 of the bus module 31 and displayed on the visual output means 36 of the storey terminal 30 or on the visual output means of the everyday device (Function 4); details with respect to the zones to be freed are read out of the data memory 310 of the bus module 31 and displayed on the visual output means 36 of the story terminal 30 or on the visual output means of the everyday device (Function 5); details with respect to the size of the data memory 310 of the bus module 31 are read and displayed on the visual output means 36 of the story terminal 30 or on the visual output means of the everyday device (Function 6); or details with respect to the already assigned passwords—by which the master uniquely identifies the user—are read out of the data memory 310 of the bus module 31 and displayed on the visual output means 36 of the story terminal 30 or on the visual output means of the everyday device (Function 7).

A fourth action 506 of the operator is exiting maintenance (Functions 1 to 4, 6 and 7) or input of the zones to be freed (Function 5). Input of the number “0” may code the exiting of the maintenance (Functions 1 to 4, 6 and 7), while input of the numbers “1 to 9” codes the desired sequence of, for example, 9 zones to which the user obtains access authorization (Function 5).

When the computer program executes Function 5, the access authorization of the user is stored in the corresponding user profile in the data memory 310 of the bus module 31. A fourth result 507 of the computer program product is a confirmation of the execution of Function 5.

A fifth action 508 of the operator is exiting maintenance (Function 5). For example, input of the number “0” codes the exiting of maintenance.

Advantageously, the computer program comprises different components. The different components of the computer program product are installed in the bus module 31, 31' in the story terminal 30 or in the everyday device 40, 41. With knowledge of the present invention one skilled in the art can realize numerous variations of this computer program. Thus, further functions can be programmed, for example the establishing of a further master information code, etc.

By virtue of the modular mode of construction of the components of the system 100, existing lift installations can be retrofitted with the system 100 in a simple and uncomplicated manner. The bus module 31, 31' is an electronic card with small constructional size. The bus module 31, 31' is, for example, a circuitboard. The bus module 31, 31' is preferably conceived as a plug-in module which can be plugged into a story terminal 30 or into a lift control 33. Existing lift installations frequently have an input/output bus 38 for communication between the call buttons with acknowledgement lamps 27 and the lift control 33. In this case the bus module 31, 31' is installed in the input/output bus 32. The computer program product can be loaded into the system 100. For example, components of the computer program product are installed in the device and in the bus module 31, 31'.

I claim:

1. A system for controlling transportation or controlling access of persons and/or goods in a building, comprising: at least one story terminal for recognition of at least one identification code of a person or an item; at least one insertable bus module having a data bank for a user profile, a first of the at least one bus module comprising at least a job manager; a lift control independent from the at least one story terminal; a signal bus for interconnecting said at least one bus module, at least one story terminal, and lift control; and one data memory for storing at least one user profile of the person or item or processor for associating a user profile with a recognized identification code, at least one of the story terminal, lift control, and an input/output bus configured for receipt of the at least one bus module, the at least one bus module communicating with the at least one story terminal by way of a signal bus, the at least one story terminal, lift control and at least one bus module each forming nodal points of the signal bus.

2. The system according to claim 1, characterized in that a second bus module is a data bank for a user profile.

3. The system according to claim 1 or 2, characterized in that the user profile contains data with respect to at least one predefined destination story of the person or item or data with respect to an access authorization of the person or item to at least one zone of the building, and that the processor includes means for associating a user profile with a recognized identification code and for communicating details with respect to at least one of the predefined destination story of the person or item, or the access authorization of the person or item to a zone, by way of the signal bus.

4. The system according to claim 1 or 2, characterized in that the processor includes means for at least one of a) processing details with respect to the boarding story and destination story of a person or item according to at least one requests table, and b) examining details with respect to the destination story and the access authorization of the person or item in at least one check routine.

5. The system according to claim 1 or 2, characterized in that the first bus module is an electric card.

6. The system according to claim 1 or 2, characterized in that the first bus module controls at least one lift control which controls a drive of a lift cage.

7. The system according to claim 1 or 2, characterized in that the story terminal includes means for activating least one access means.

8. A method of maintenance of a system for transportation or access control of persons and/or goods in at least one building, comprising the steps of installing as nodal points at least one bus module having a job manager and bearing programmable user profile data including predefined destination stories and access authorization in one of a distinct nodal point story terminal, lift control, or input/output bus of the system, and inputting by way of a story terminal or an everyday device: a) a change in at least one user profile in which data with respect to a predefined destination story of a person or item or data with respect to an access authorization of the person or item to at least one zone of the building are stored; or b) a configuration of an identification transmitter which transmits an identification code; and passing the inputted change or configuration to the at least one bus module configured as a nodal point by way of a signal bus.

9. A device for maintenance of a system for transportation or access control of persons and/or goods in at least one building, which system comprises at least one nodal point story terminal for recognition of at least one identification code of a person or an item, characterized in that the device comprises means for at least one of a) changing at least one user profile located in an installable nodal point bus module inserted into one of a story terminal, lift control, or input/output bus of the system which user profile contains data with respect to the predefined destination story of the person or item or details with respect to the access authorization of the person or item to at least one zone of the building, or b) configuring an identification transmitter which transmits an identification code by passing the change or configuration to the bus module by way of a signal bus.

10. The device of claim 9 wherein said means is a story terminal configured as a nodal point or an everyday device.

11. The device according to claim 10, characterized in that the everyday device is a cordless telephone or a fixed system telephone.

12. The device according to claim 9, 10 or 11, characterized in that the device has a manual input means or a microphone for changing the user profile or configuration of the identification transmitter.

13. A computer program for maintenance of a system for transportation or access control of persons and/or goods in at least one building, which system comprises at least one story terminal for recognition of at least one identification code of a person or an item and at least one installable bus module nodal point bearing a job manager and programmable user profiles inserted into one of a nodal point story terminal, lift control, or input/output bus of the system, characterized in that the computer program product is loaded into at least one of the bus modules through a signal bus and includes means for a) changing at least one user profile which contains data with respect to at least one of i) a predefined destination story of the person or ii) item or details with respect to an access authorization of the person or item to at least one zone of the building, or b) configuring at least one identification transmitter for transmitting an identification code.

14. The computer program according to claim 13, characterized in that the computer program product includes means for recognizing the input of at least one function code, recognizing the input of at least one functional data, and for executing a function which is associated with the function code with the functional data.

15. The computer program according to claim 13 or 14, characterized in that the computer program includes means for executing at least one of "add user," "remove user," "assign new identification transmitter," "display user profile," "free or delete zones," "display data memory size," or "display already allocated passwords" functions.

16. A method of retrofitting a building with a system for transportation or access control of persons and/or goods, wherein at least one identification code of a person or an item is recognized at at least one story terminal, characterized in that a job manager and at least one user profile of a person or item is stored in at least one installable bus module, that a recognized identification code is associated with a user profile in the bus module and that the bus module is installed in a story terminal, lift control, or input/output bus of the system the at least one bus module, the at least one story terminal, and lift control form nodal points for a signal bus.

17. A system for controlling transportation or controlling access of persons and/or goods in a building, comprising: at least one story terminal for recognition of at least one identification code of a person or an item; a data bank bus module comprising at least one data memory for storing at least one user profile of the person or item or processor for associating a user profile with a recognized identification code; and a job manager bus module with at least one of a requests table or check routine, the bus modules communicating with the at least one story terminal by way of a signal bus.

18. The system according to claim 17, characterized in that the user profile contains data with respect to at least one predefined destination story of the person or item or data with respect to an access authorization of the person or item to at least one zone of the building, and that the processor includes means for associating a user profile with a recognized identification code and for communicating details with respect to at least one of the predefined destination story of the person or item, or the access authorization of the person or item to a zone, by way of the signal bus.

19. The system according to claim 17, characterized in that the processor includes means for at least one of a) processing details with respect to the boarding story and destination story of a person or item according to at least one requests table, and b) examining details with respect to the destination story and the access authorization of the person or item in at least one check routine.

20. The system according to claim 17, characterized in that at least one of the bus modules is in the form of an electric card.

21. The system according to claim 17, characterized in that at least one of the bus module controls at least one lift control which controls a drive of a lift cage.

22. The system according to claim 17, characterized in that the story terminal includes means for activating least one access means.

* * * * *